US011089459B2

(12) United States Patent
Tseng et al.

(10) Patent No.: US 11,089,459 B2
(45) Date of Patent: Aug. 10, 2021

(54) STORAGE SERVICE FOR MOBILE NODES IN A ROADWAY AREA

(71) Applicant: TOYOTA JIDOSHA KABUSHIKI KAISHA, Toyota (JP)

(72) Inventors: Lewis Tseng, Mountain View, CA (US); Kentaro Oguchi, Mountain View, CA (US)

(*) Notice: Subject to any disclaimer, the term of this patent is extended or adjusted under 35 U.S.C. 154(b) by 55 days.

(21) Appl. No.: 15/358,567

(22) Filed: Nov. 22, 2016

(65) Prior Publication Data

US 2018/0146323 A1    May 24, 2018

(51) Int. Cl.
| H04W 4/80 | (2018.01) |
| H04L 29/08 | (2006.01) |
| H04W 68/00 | (2009.01) |
| H04W 4/46 | (2018.01) |
| H04W 4/029 | (2018.01) |
| H04W 84/00 | (2009.01) |

(52) U.S. Cl.
CPC .......... *H04W 4/80* (2018.02); *H04L 67/1097* (2013.01); *H04L 67/12* (2013.01); *H04W 4/029* (2018.02); *H04W 4/46* (2018.02); *H04W 68/00* (2013.01); *H04W 84/005* (2013.01)

(58) Field of Classification Search
CPC ... H04W 4/008; H04W 68/00; H04W 84/005; H04L 67/1097; H04L 67/12
USPC ....................................................... 455/41.2
See application file for complete search history.

(56) References Cited

U.S. PATENT DOCUMENTS

| 10,354,528 B2* | 7/2019 | Jiang ................. G08G 1/096783 |
| 2005/0108247 A1* | 5/2005 | Heinla ..................... H04L 29/06 |
| 2005/0221752 A1* | 10/2005 | Jamieson ................ H04L 45/04 |
| | | 455/1 |
| 2005/0240591 A1* | 10/2005 | Marceau .................. G06F 16/10 |
| 2009/0138196 A1* | 5/2009 | Laberteaux ....... G08G 1/096783 |
| | | 701/484 |
| 2010/0194592 A1* | 8/2010 | Yim .................. G08G 1/096741 |
| | | 340/905 |
| 2012/0158820 A1* | 6/2012 | Bai ........................ G07C 5/008 |
| | | 709/202 |

(Continued)

FOREIGN PATENT DOCUMENTS

WO PCT/US2016062687    * 11/2016 ............. H04L 12/56

*Primary Examiner* — Jinsong Hu
*Assistant Examiner* — Rui M Hu
(74) *Attorney, Agent, or Firm* — Burbage Law, P.C.; Jon-Michael Burbage; Elizabeth Ruzich

(57) ABSTRACT

The disclosure includes embodiments for providing a storage service for mobile nodes in a roadway area. A method may include a vehicle communicatively coupled to a mobile node via a non-infrastructure network, wherein the vehicle and the mobile node are present in a roadway area which is partitioned into a plurality of roadway regions which are predetermined and known to the vehicle and the mobile node. The method may include transmitting, by the vehicle via the non-infrastructure network, a wireless message to the mobile node, wherein the wireless message includes content including one or more of an instance of spatial key data describing a particular roadway region of the roadway environment and an identifier of a value stored in a memory present in the particular roadway region described by the spatial data. The method may include receiving, by the mobile node via the non-infrastructure network, the wireless message.

20 Claims, 12 Drawing Sheets

(56) References Cited

U.S. PATENT DOCUMENTS

| | | | |
|---|---|---|---|
| 2012/0188934 A1* | 7/2012 | Liu | H04L 12/1863 370/312 |
| 2013/0279392 A1* | 10/2013 | Rubin | H04L 67/12 370/312 |
| 2013/0301584 A1* | 11/2013 | Addepalli | H04W 4/046 370/329 |
| 2015/0254987 A1* | 9/2015 | Altintas | G01C 21/34 701/409 |
| 2015/0365278 A1* | 12/2015 | Chakrabarti | H04W 4/70 370/254 |
| 2016/0021178 A1* | 1/2016 | Liu | H04L 67/1042 370/216 |
| 2016/0065355 A1* | 3/2016 | Kenney | H04L 5/16 370/276 |
| 2016/0080279 A1* | 3/2016 | Tan | H04W 40/20 370/328 |
| 2016/0295589 A1* | 10/2016 | Nikopour | H04W 4/023 |
| 2017/0069200 A1* | 3/2017 | Masutani | H04L 67/42 |
| 2017/0086103 A1* | 3/2017 | Neves | H04W 36/0022 |
| 2017/0140645 A1* | 5/2017 | Balid | G08G 1/0116 |
| 2017/0150299 A1* | 5/2017 | Coutinho | H04W 4/008 |
| 2017/0208632 A1* | 7/2017 | Gunasekara | H04W 76/02 |
| 2017/0332208 A1* | 11/2017 | Cardoso de Moura | H04W 4/046 |
| 2018/0211544 A1* | 7/2018 | Smartt | G06F 21/30 |
| 2019/0079540 A1* | 3/2019 | Yoon | H04W 4/40 |
| 2019/0130755 A1* | 5/2019 | Lin | G06Q 10/02 |

\* cited by examiner

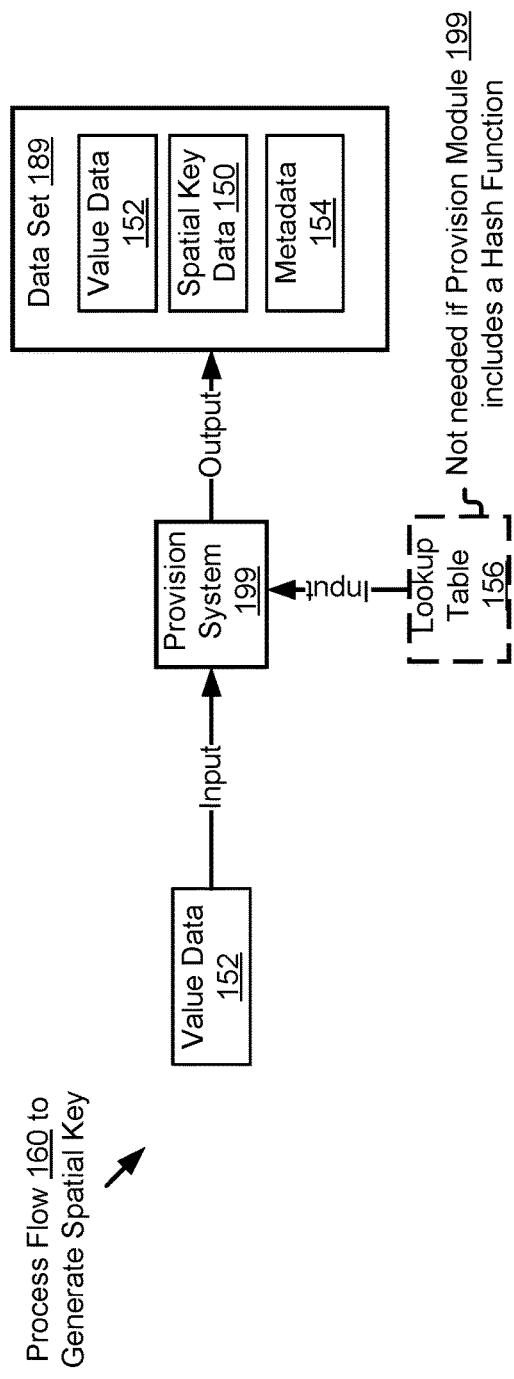
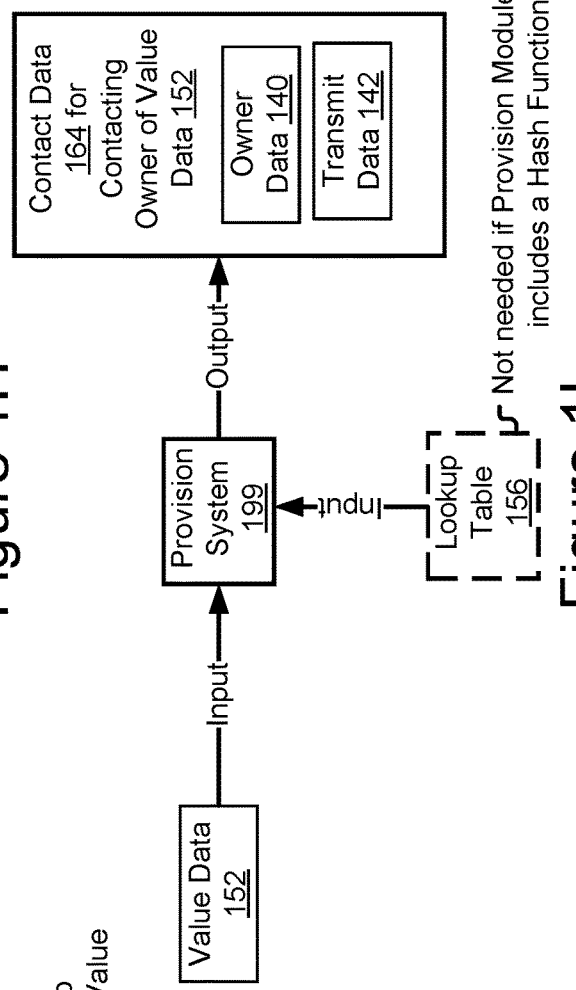

DSRC DATA 195

- Vehicles and other client devices equipped with Direct Short Range Communication ("DSRC") transmit a Basic Safety Message ("BSM") at a regular interval.

- Each DSRC message includes the following DSRC data describing one or more of the following for the vehicle that originally sent the DSRC message:
    (1) GPS Data Describing the Location of the Vehicle, where the GPS Data may be so accurate that it describes the specific lane the Vehicle is traveling in;
    (2) Heading Data Describing the Direction of travel for the Vehicle;
    (3) Velocity Data Describing the Velocity of the Vehicle; and
    (4) Path History of Vehicle.

Figure 1J

DSRC DATA 195

Part 1
Vehicle Position Data (local 3D)
- Latitude
- Longitude
- Elevation
- Positional accuracy
- Time Vehicle Motion Data
- Transmission state
- Speed
- Heading
- Steering wheel angle
- Acceleration set (4-way, i.e., 3 axes of acceleration plus yaw rate
- Brake system status Vehicle Size Data

Part 2
Vehicle Path History
Future Vehicle Path Estimation
Hard Active Braking
Traction Control System active over 100 milliseconds?
Antilock Brake System active over 100 milliseconds?
Light Status
Wiper Status
Vehicle type

Figure 1K

STORAGE SERVICE FOR MOBILE NODES IN A ROADWAY AREA

BACKGROUND

The specification relates to a storage service for mobile nodes in a roadway area.

Vehicles may access and use a cloud storage system. A cloud storage system involves a vehicle wirelessly communicating with a server via a cellular network. The vehicle may receive data stored on the server. The vehicle may store data on the server.

Cloud storage systems that rely on cellular communications are undesirable because they rely on infrastructure such as cellular towers. Infrastructure-dependent wireless communication must establish communication with cellular towers and other infrastructure, and must reply on the communication protocol of this infrastructure, which is frequently designed to favor the needs of the entity that owns this infrastructure and not the needs of the endpoints (e.g., the vehicles) that rely on this infrastructure. The infrastructure itself tends to be out of date and slow relative to the communication capabilities of the endpoints because providing updates to this infrastructure costs money and does not necessarily add to the profits of the corporations that own and operate this infrastructure. As a result, infrastructure-dependent wireless communication is not suitable for modern vehicles that need to be able to access data in real-time or near real-time.

Experience and experimentation also show that infrastructure-dependent wireless communication is not capable of working in the presence of network partitions. Experience and experimentation also show that infrastructure-dependent wireless communication struggles to maintain communication when endpoints are moving, as vehicles are prone to do.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a system including: a vehicle communicatively coupled to a mobile node via a non-infrastructure network; where the vehicle and the mobile node are present in a roadway area which is partitioned into a plurality of roadway regions which are predetermined and known to the vehicle and the mobile node; where the vehicle transmits, via the non-infrastructure network, a wireless message to the mobile node; where the wireless message includes content including one or more of an instance of spatial key data describing a particular roadway region of the roadway environment and an identifier of a value stored in a memory present in the particular roadway region described by the spatial data; and where the mobile node receives the wireless message via the non-infrastructure network. Other embodiments of this aspect include corresponding computer systems, apparatus, and computer programs recorded on one or more computer storage devices, each configured to perform the actions of the methods.

Implementations may include one or more of the following features. The system where the non-infrastructure network includes a dedicated short range communication network formed between the vehicle and the mobile node and the wireless message includes a dedicated short range communication message. The system where the non-infrastructure network includes a millimeter wave communication network formed between the vehicle and the mobile node and the wireless message includes a millimeter wave communication message. The system where the non-infrastructure network includes a full-duplex wireless communication network formed between the vehicle and the mobile node and the wireless message includes a full-duplex wireless communication message. The system where the mobile node is a second vehicle. The system where the mobile node is a smartphone. The system where the wireless message is a write message, the identifier of the value included in the content of the write message includes value data corresponding to the spatial key data and the mobile node identifies which of a plurality of mobile nodes of the roadway region identified by the spatial key data is an owner of the content of the wireless message and the mobile node takes steps to store the content in a non-transitory memory of the owner. The system where the wireless message is a read message and the mobile node identifies which of a plurality of mobile nodes of the roadway region identified by the spatial key data is an owner of the content of the wireless message and the mobile node takes steps to identify value data corresponding to the spatial key data included in the content and provide a reply message to the vehicle, via the non-infrastructure network, that includes the value data corresponding to the spatial key data. Implementations of the described techniques may include hardware, a method or process, or computer software on a computer-accessible medium.

One general aspect includes a method implemented by a vehicle communicatively coupled to a mobile node via a non-infrastructure network, where the vehicle and the mobile node are present in a roadway area which is partitioned into a plurality of roadway regions which are predetermined and known to the vehicle and the mobile node, the method including: transmitting, by the vehicle via the non-infrastructure network, a wireless message to the mobile node, where the wireless message includes content including one or more of an instance of spatial key data describing a particular roadway region of the roadway environment and an identifier of a value stored in a memory present in the particular roadway region described by the spatial data; receiving, by the mobile node via the non-infrastructure network, the wireless message; providing, by the mobile node via the non-infrastructure network, a response message to the wireless message; and receiving, by the vehicle via the non-infrastructure network, the response message in substantially real time relative to the time when the wireless message was transmitted. Other embodiments of this aspect include corresponding computer systems, apparatus, and computer programs recorded on one or more computer storage devices, each configured to perform the actions of the methods.

Implementations may include one or more of the following features. The method where the non-infrastructure network includes a dedicated short range communication network formed between the vehicle and the mobile node and the wireless message includes a dedicated short range communication message. The method where the non-infrastructure network includes a millimeter wave communication network formed between the vehicle and the mobile node and the wireless message includes a millimeter wave communication message. The method where the non-infrastructure network includes a full-duplex wireless communication network formed between the vehicle and the mobile node and the wireless message includes a full-duplex wireless communication message. The method where the mobile node is a second vehicle. The method where the mobile node is a smartphone. The method where the wireless message is a write message, the identifier of the value included in the content of the write message includes value data corresponding to the spatial key data and the mobile node identifies which of a plurality of mobile nodes of the roadway region identified by the spatial key data is an owner of the content of the wireless message and the mobile node takes steps to store the content in a non-transitory memory of the owner. The method where the wireless message is a read message and the mobile node identifies which of a plurality of mobile nodes of the roadway region identified by the spatial key data is an owner of the content of the wireless message and the mobile node takes steps to identify value data corresponding to the spatial key data included in the content and provide a reply message to the vehicle, via the non-infrastructure network, that includes the value data corresponding to the spatial key data. Implementations of the described techniques may include hardware, a method or process, or computer software on a computer-accessible medium.

One general aspect includes a computer program product including a non-transitory memory of an onboard vehicle computer system of a vehicle communicatively coupled to a mobile node via a non-infrastructure network, where the vehicle and the mobile node are present in a roadway area which is partitioned into a plurality of roadway regions which are predetermined and known to the vehicle and the mobile node, where the onboard vehicle computer system stores computer-executable code that, when executed by the onboard vehicle computer system, causes the onboard vehicle computer system to: transmit, via the non-infrastructure network, a wireless message to the mobile node, where the wireless message includes content including one or more of an instance of spatial key data describing a particular roadway region of the roadway environment and an identifier of a value stored in a memory present in the particular roadway region described by the spatial data; and receive, by the mobile node via the non-infrastructure network, a response message in substantially real time relative to the time when the wireless message was transmitted, where the mobile node, responsive to receiving the wireless message via the non-infrastructure network provides, via the non-infrastructure network, the response message to the wireless message. Other embodiments of this aspect include corresponding computer systems, apparatus, and computer programs recorded on one or more computer storage devices, each configured to perform the actions of the methods.

Implementations may include one or more of the following features. The computer program product where the non-infrastructure network includes a dedicated short range communication network formed between the vehicle and the mobile node and the wireless message includes a dedicated short range communication message. The computer program product where the non-infrastructure network includes a millimeter wave communication network formed between the vehicle and the mobile node and the wireless message includes a millimeter wave communication message. The computer program product where the non-infrastructure network includes a full-duplex wireless communication network formed between the vehicle and the mobile node and the wireless message includes a full-duplex wireless communication message. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIG. 1H is a block diagram illustrating a process flow for provision system to identify a spatial key according to some embodiments.

FIG. 1I is a block diagram illustrating a process flow for provision system to identify an owner of a value and data for contacting the owner of the value according to some embodiments.

FIG. 1J is a block diagram illustrating Dedicated Short Range Communication data ("DSRC data") including path history data for a vehicle according to some embodiments.

FIG. 1K is a block diagram illustrating DSRC data according to some embodiments.

DETAILED DESCRIPTION

A roadway region is a portion of a roadway environment. For example, an intersection may be a first roadway region, an on-ramp may be a second roadway region and stop sign may be a third roadway region. Any other discrete portion of a roadway environment may be a roadway region.

Described herein is a regional storage system. A regional storage system includes a plurality of mobile nodes that each include a provision system as described herein.

A mobile node may include any processor-based computing device that is present in a roadway environment and capable of moving by itself or while present in or on some other object that is itself movable. For example, one or more of the following processor-based computing devices may be a mobile node: a vehicle; a smartphone on a human user present in a vehicle; and a smart device on a human user present in a vehicle.

Two or more mobile nodes may each include a provision system. These two or more mobile nodes form a regional storage system if: (1) they are present in the same roadway region; and (2) are communicatively coupled, or capable of communicatively coupling, to one another via a non-infrastructure-based network.

An example of a non-infrastructure-based network is two vehicles that wirelessly communicate with each other via Dedicated Short Range Communication ("DSRC"), millimeter wave ("mmWave") communication or full-duplex wireless communication (as described in U.S. patent application Ser. No. 14/471,387 filed on Aug. 28, 2014 and entitled "Full-Duplex Coordination System," the entirety of which is herein incorporated by reference).

Compared with existing solutions, the regional storage system described herein has the following example benefits: (1) it does not need infrastructure [e.g., network towers, servers, server farms, etc.]; (2) it supports real-time or substantially real-time data retrieval [e.g., among two or more different mobile nodes as described herein]; (3) it supports real-time or substantially real-time data writing [e.g., among two or more different mobile nodes as described herein]; (4) it works correctly in the presence of one or more network partitions [e.g., the presence of a network partition from the perspective of one mobile node does not prevent that mobile node from writing or reading data in real-time or substantially real time]; and (5) it works when one or more of the mobile nodes are in motion at roadway speeds [e.g., a mobile node is moving at 0.1 to 85.0 miles per hour].

Figure 1A:
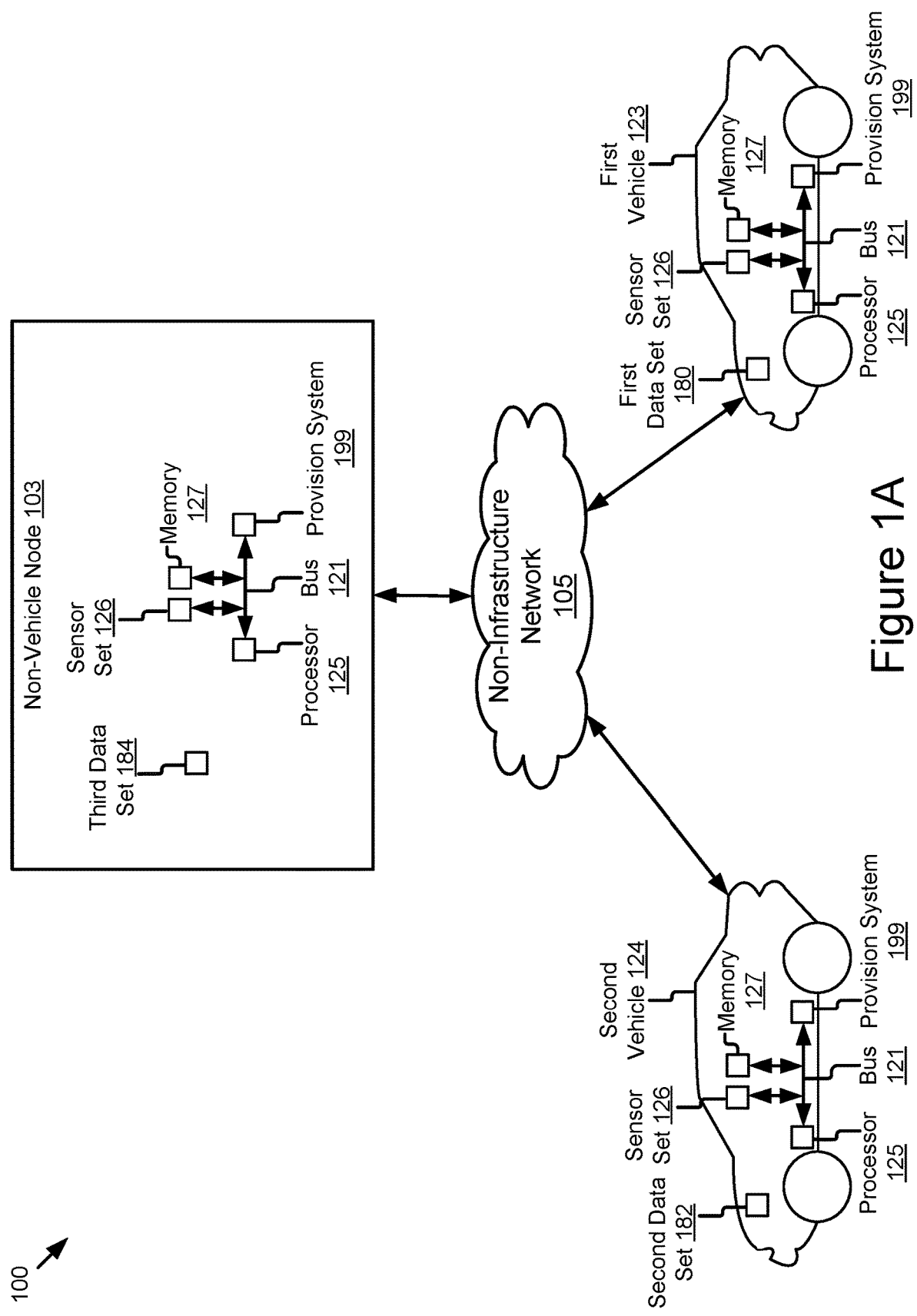
FIG. 1A is a block diagram illustrating an operating environment for a regional storage system according to some embodiments.

Referring now to FIG. 1A, depicted is a block diagram illustrating an operating environment 100 for a regional storage system according to some embodiments. The operating environment 100 is present in a roadway region so that each of the elements of the operating environment 100 is present in the same roadway region.

The operating environment 100 may include one or more of the following elements: a first vehicle 123; a second vehicle 124 and a non-vehicle node 103. These elements of the operating environment 100 may be communicatively coupled to one another via a non-infrastructure network 105. These elements of the operating environment 100 are depicted by way of illustration. In practice, the operating environment 100 may include one or more first vehicles 123, one or more second vehicles 124 and one or more non-vehicle nodes 103. The operating environment 100 may also include zero of the first vehicle 123, the second vehicle 124 or the non-vehicle nodes 103 so long as at least two of these elements are present to form a regional storage system as described herein.

A regional storage system may include any two devices selected from the operating environment 100, of the same or different kind, which each include a provision system 199 and wirelessly communicate with one another to form a non-infrastructure network 105 to read and write data among themselves as described herein.

In the depicted embodiment, the first vehicle 123, the second vehicle 124 and the non-vehicle node 103 include similar elements. For example, each of these elements of the operating environment 100 include their own provision system 199, memory 127, bus 121, processor 125 and sensor set 126. These elements of the first vehicle 123, the second vehicle 124 and the non-vehicle node 103 provide the same or similar functionality relative to one another.

In the depicted embodiment, the first vehicle 123, the second vehicle 124 and the non-vehicle node 103 each store different data sets. For example, the first vehicle 123 includes a first data set 180, the second vehicle 124 includes a second data set 182 and the non-vehicle node 103 includes a third data set 184. The first data set 180 is stored on the memory 127 of the first vehicle 123, the second data set 182 is stored on the memory 127 of the second vehicle 124 and the third data set 184 is stored on the memory 127 of the non-vehicle node 103.

The non-infrastructure network 105 (herein, the "the network 105") may be any conventional wireless network that does not include infrastructure such as cellular towers, servers or server farms. In some embodiments, the network 105 includes Bluetooth® communication networks for sending and receiving data including via one or more of DSRC, mmWave, full-duplex wireless communication and any other type of wireless communication that does not include infrastructure elements. The network 105 may include vehicle-to-vehicle communication such as a Wi-Fi™ network shared among two or more vehicles 123.

The network 105 specifically does not include a mobile data network including third-generation (3G), fourth-generation (4G), fifth-generation (5G), long-term evolution (LTE), Voice-over-LTE ("VoLTE") or any other mobile data network that relies on infrastructure such as cellular towers, hardware servers or server farms.

The first vehicle 123 may include a car, a truck, a sports utility vehicle, a bus, a semi-truck, a drone or any other roadway-based conveyance. In some embodiments, the first vehicle 123 may include an autonomous vehicle or a semi-autonomous vehicle.

In some embodiments, the first vehicle 123 is a connected vehicle. For example, the first vehicle 123 is communicatively coupled to the network 105 and can send and receive messages via the network 105, and this quality may make the first vehicle 123 a "connected vehicle."

The second vehicle 124 may be similar to the first vehicle 123, and so, that description will not be repeated here.

The non-vehicle node 103 may include any processor-based computing device that is present in a roadway environment, includes the provision system 199 and is not a vehicle such as the first vehicle 123 or the second vehicle 124. In some embodiments, the non-vehicle node 103 is one of the following: a smartphone; a laptop; a personal computer; a tablet computer; and a smart watch or some other smart device. The non-vehicle node 103 is communicatively coupled to the network 105 and can send and receive messages via the network 105.

The first vehicle 123, the second vehicle 124 and the non-vehicle node 103 may each include one or more of the following elements: a processor 125; a sensor set 126; a memory 127 and a provision system 199. These elements may be communicatively coupled to one another via a bus 121. The memory 127 may store data or information. For example, the memory 127 of the first vehicle 123 stores the first data set 180, the memory 127 of the second vehicle 124 stores the second data set 182 and the memory of the non-vehicle node 103 stores the third data set 184.

The elements common to the first vehicle 123, the second vehicle 124 and the non-vehicle node 103 are now described.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1A includes a single processor 125 present in the first vehicle 123, the second vehicle 124 or the non-vehicle node 103, multiple processors may be included in one or more of these elements of the operating environment 100. The processor 125 may include a graphical processing unit. Other processors, operating systems, sensors, displays, and physical configurations may be possible.

In some embodiments, the processor 125 may be an element of a processor-based computing device of the first vehicle 123 or the second vehicle 123. For example, the first vehicle 123 may include one or more of the following processor-based computing devices and the processor 125 may be an element of one of these devices: an onboard vehicle computer; an electronic control unit; a navigation system; an advanced driver assistance system ("ADAS system") and a head unit.

In some embodiments, the sensor set 126 may include one or more sensors. The sensor set 126 may collect sensor data. The sensor data may describe, for example, a physical environment of the roadway environment which is external to the first vehicle 123, the second vehicle 124 of the non-vehicle node 103. For example, the sensor set 126 may include one or more external sensors that measure the physical environment external to one or more of the first vehicle 123, the second vehicle 124 or the non-vehicle node 103.

In some embodiments, the sensor set 126 may record a physical environment internal to the first vehicle 123 or the second vehicle 124. For example, the sensor set 126 may include one or more internal sensors that monitor and measure the actions of the driver of one or more of the first vehicle 123 and the second vehicle 124.

In some embodiments, the sensor set 126 may include one or more sensors that are operable to measure the physical environment outside one or more of the first vehicle 123, the second vehicle 124 and the non-vehicle node 103. For example, the sensor set 126 may record one or more physical characteristics of the physical environment that is proximate to one or more of the first vehicle 123, the second vehicle 124 and the non-vehicle node 103.

In some embodiments, the sensor set 126 may include one or more sensors that are operable to measure the physical environment inside a cabin of one or more of the first vehicle 123 and the second vehicle 124. For example, the sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 126 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the DSRC-compliant GPS unit); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 126 may be operable to record sensor data that describes one or more locations of a device (e.g., one or more of the first vehicle 123, the second vehicle 124 of the non-vehicle node 103) at one or more different times, images or other measurements of the roadway environment and objects or other vehicles present in the roadway environment such as pedestrians, animals, traffic signs, traffic lights, pot holes, etc.

The roadway environment may include a roadway region that is proximate to one or more of the first vehicle 123, the second vehicle 124 and the non-vehicle node 103. For example, the first vehicle 123 may be in motion on a roadway and the roadway environment may include one or more vehicles that are in front of the first vehicle 123, behind the first vehicle 123, beside the first vehicle 123 or one or more car lengths away from the first vehicle 123. The sensor data may describe measurable aspects of the roadway environment.

In some embodiments, the sensor data may describe an event present in the roadway environment. The event may be any roadway condition that causes roadway congestion, is an indication of roadway congestion or is a result of roadway congestion. The event may also include an opening between two objects of the roadway environment which is big enough for a vehicle (e.g., the first vehicle 123 or the second vehicle 124) to enter or pass through without causing a collision or nearly causing a collision.

The memory 127 may include a non-transitory storage medium. The memory 127 may store instructions or data that may be executed by the processor 125. The instructions or data may include code for performing the techniques described herein. The memory 127 may be a dynamic random access memory (DRAM) device, a static random access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 may store any or all of the data described below with reference to FIGS. 1D-1K, 2, 3 and 4.

The provision system 199 may include code and routines that are operable, when executed by the processor 125, to cause the processor 125 to execute a write command responsive to receiving a write message or execute a read command responsive to receiving a read message. The functionality of the provision system 199 is described in more detail below with reference to FIGS. 1B-1K and 2-5.

The first vehicle 123, second vehicle 124 and the non-vehicle node 103 each include a communication unit. The communication unit is described in more detail below with reference to element 245 of FIG. 2.

The communication unit may include a Dedicated Short Range Communication ("DSRC") unit including a DSRC receiver and a DSRC transceiver which enable the first vehicle 123, the second vehicle 123 and the non-vehicle node 103 to send and receive wireless messages via the DSRC protocol ("DSRC messages"). A device that includes a DSRC unit and may send and receive DSRC messages is referred to herein as being DSRC-enabled.

In some embodiments, the first vehicle 123, the second vehicle 124 and the non-vehicle node 103 are each DSRC-enabled. In this way, the first vehicle 123, the second vehicle 124 and the non-vehicle node 103 may send and receive DSRC messages to one another. For example, any of the read messages, write messages or the acknowledgement messages described herein may be DSRC messages.

In some embodiments, one or more of the first vehicle 123, the second vehicle 124 and the non-vehicle node 103 may include a full-duplex coordination system as described in U.S. patent application Ser. No. 14/471,387 filed on Aug. 28, 2014 and entitled "Full-Duplex Coordination System." In this way, one or more of these elements of the operating environment 100 may transmit full-duplex wireless messages to one another. For example, any of the read messages, write messages or the acknowledgement messages described herein may be full-duplex wireless messages.

In some embodiments, one or more of the communication units of the first vehicle 123, the second vehicle 124 and the non-vehicle node 103 may include a mmWave communication transceiver and receiver. In this way, one or more of these elements of the operating environment 100 may transmit mmWave messages to one another. For example, any of the read messages, write messages or the acknowledgement messages described herein may be mmWave messages.

In some embodiments, the provision system 199 of one or more of the first vehicle 123, the second vehicle 124 and the non-vehicle node 103 may be implemented using hardware including a field-programmable gate array ("FPGA") or an application-specific integrated circuit ("ASIC"). In some other embodiments, the provision system 199 of one or more of the first vehicle 123, the second vehicle 124 and the non-vehicle node 103 may be implemented using a combination of hardware and software.

In some embodiments, the wireless messages described herein may be encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the provision system 199 of one or more of the first vehicle 123, the second vehicle 124 and the non-vehicle node 103 may include encryption keys for encrypting wireless messages and decrypting the wireless messages described herein.

Figure 1B:
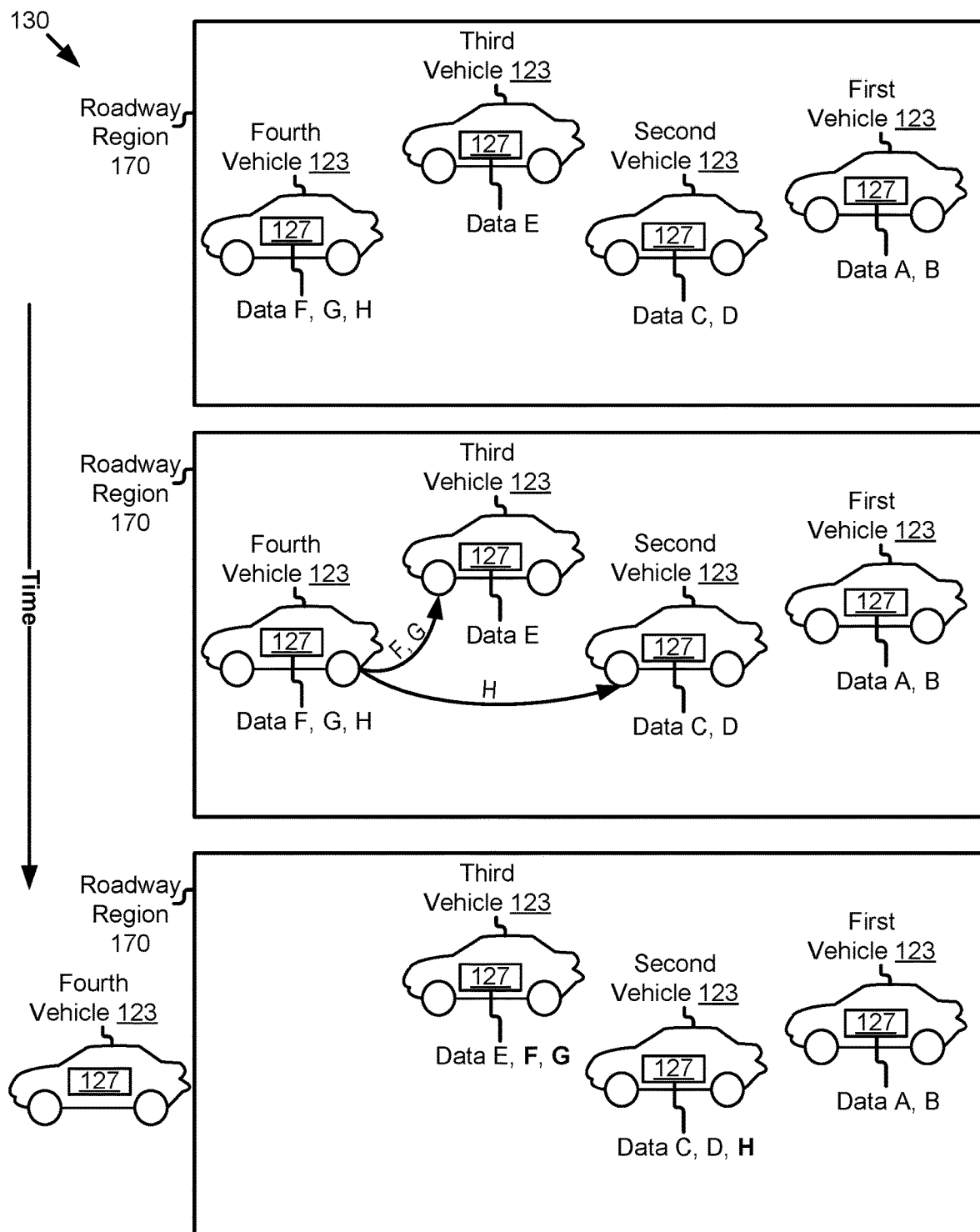
FIG. 1B is a block diagram illustrating a process flow for the operation of a regional storage system formed by a plurality of vehicles of a same roadway region each including a provision system according to some embodiments.

Referring now to FIG. 1B, depicted is a block diagram illustrating a process flow 130 for the operation of a regional storage system formed by a plurality of vehicles 123 of a same roadway region 170, each including a provision system 199 according to some embodiments. The provision systems 199 included in the priority of vehicles 123 are not depicted in FIG. 1B. One or more of the plurality of vehicles 123 are in motion. For example, they may be traveling on a roadway at highway speeds (e.g., 55 miles per hour).

The process flow 130 is depicted so that the same roadway region 170 is depicted three times in FIG. 1B, with the roadway region 170 depicted at the top of FIG. 1B occurring earliest in time, the roadway region 170 depicted in the middle of FIG. 1B occurring second in time and the roadway region 170 depicted at the bottom of FIG. 1B occurring third in time.

The roadway region 170 occurring earliest in time includes the following elements: a first vehicle 123; a second vehicle 123; a third vehicle 123; and a fourth vehicle 123. Each of the first vehicle 123, the second vehicle 123, the third vehicle 123 and the fourth vehicle 123 include a memory 127, each memory 127 storing data so that the collective data of the roadway region 170 is stored in a distributed fashion.

The first vehicle 123 in the depicted roadway region 170 occurring earliest in time includes "Data A" and "Data B." The second vehicle 123 in the depicted roadway region 170 occurring earliest in time includes "Data C" and "Data D." The third vehicle 123 in the depicted roadway region 170 occurring earliest in time includes "Data E." The fourth vehicle 123 in the depicted roadway region 170 occurring earliest in time includes "Data F," "Data G" and "Data F."

Referring now to the depicted roadway region 170 occurring second in time, the provision system 199 of the fourth vehicle 123 determines, based on the heading and path history of the fourth vehicle 123, that the fourth vehicle 123 is leaving the roadway region 170. Accordingly, the provision system 199 of the fourth vehicle 123 determines that "Data F," "Data G" and "Data H" will be transmitted to other vehicles of the roadway region 170. The provision system 199 of the fourth vehicle 123 transits, via the network 105, "Data F" and "Data G" to the third vehicle 123. The provision system 199 of the fourth vehicle 123 transits, via the network 105, "Data H" to the second vehicle 123.

In some embodiments, the plurality of vehicles 123 each store a lookup table that describes, among other things, an identifier (e.g., a node ID) of each of the vehicles 123 included in the roadway region 170 and the data stored by each vehicle 123 included in the roadway region 170. The provision system 199 of the fourth vehicle 123 (or some other vehicle 123 included in the plurality that is a coordinator vehicle of the plurality, as described in more detail below with reference to FIGS. 1C and 1D) updates the lookup table to indicate the new storage location of "Data F," "Data G" and "Data H." The provision system 199 transmits data, via the network 105, to the other vehicles 123 of the plurality included in the roadway region 170; this data describes the changes to the lookup table or includes a new copy of the lookup table as modified to reflect the changes described above.

Referring now to the depicted roadway region 170 occurring third in time, the fourth vehicle 123 has left the roadway region 170 and is now not a member of the plurality of vehicles 123 for this roadway region.

Figure 1C:
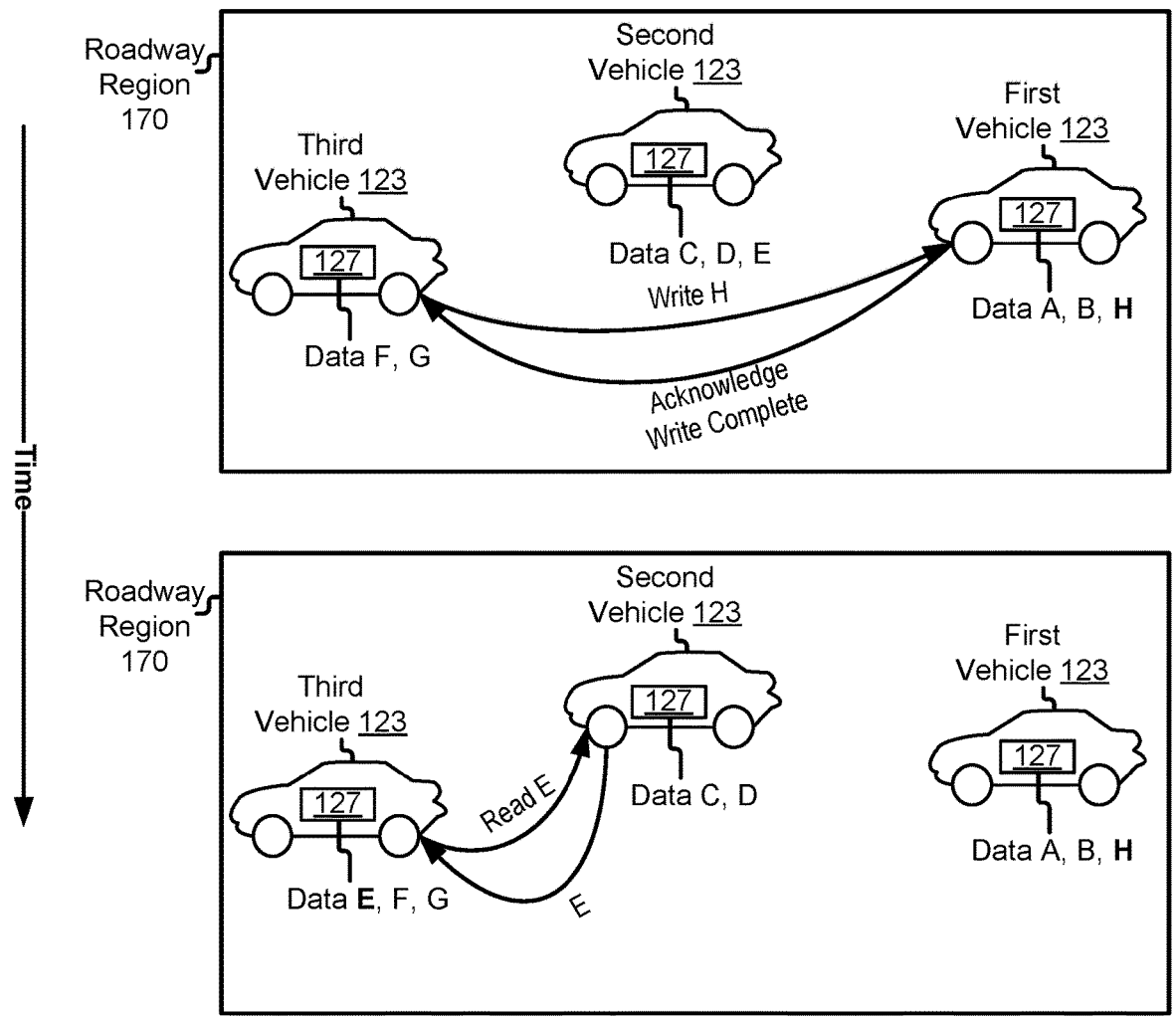
FIG. 1C is a block diagram illustrating a process flow for a write command and a read command executed among a plurality of provision systems of a same roadway region according to some embodiments.

Referring now to FIG. 1C, depicted is a block diagram illustrating a process flow 132 for a write command and a read command executed among a plurality of provision systems 199 of a same roadway region 170 according to some embodiments. As with FIG. 1B, the provision systems 199 of the plurality of vehicles 123 are not depicted in FIG. 1C.

FIG. 1C is shows a same roadway region 170 over a period of time. The roadway region 170 depicted at the top of FIG. 1C occurs earliest in time. The roadway region 170 depicted at the bottom of FIG. 1C occurs second in time relative to the roadway region 170 depicted above it.

The roadway region 170 occurring earliest in time includes the following elements: a first vehicle 123; a second vehicle 123; and a third vehicle 123. Each of the first vehicle 123, the second vehicle 123 and the third vehicle 123 include a memory 127, each memory 127 storing data so that the collective data of the roadway region 170 is stored in a distributed fashion.

The first vehicle 123 in the depicted roadway region 170 occurring earliest in time includes "Data A" and "Data B." The second vehicle 123 in the depicted roadway region 170 occurring earliest in time includes "Data C," "Data D" and "Data E." The third vehicle 123 in the depicted roadway region 170 occurring earliest in time includes "Data F," "Data G" and "Data H."

The provision system 199 of the third vehicle 123 transmits a write message to the first vehicle 123 indicated that Data H" is to be stored in the first vehicle 123.

For example, the third vehicle 123 may be a coordinator vehicle. The coordinator vehicle is the vehicle within a specific roadway region 170 which determines which mobile node included in the roadway region 170 stores which data. As the third vehicle 123 is the coordinator vehicle of this particular roadway region 170 in this example, the provision system 199 of the third vehicle 123 may receive "Data H" from some other node and then determine that "Data H" is to be stored by the memory 127 the first vehicle 123, and so, the provision system 199 of the third vehicle 123 may transmit the write message (including a write command) to the first vehicle 123 via the network 105. A provision system 199 of the first vehicle 123 stores "Data H" in a memory 127 of the first vehicle 123 and transmits an acknowledgement message to the third vehicle 123 indicating that the write operation is completed so that "Data H" is stored by the first vehicle 123.

Referring now to the depicted roadway region 170 occurring second in time, the provision system 199 of the third vehicle 123 determines that "Data E" is to be stored by the memory 127 of the third vehicle 123. The provision system 199 of the third vehicle 123 transmits, via the network 105, a read message indicating that "Data E" is to be stored by the third vehicle 123. The provision system 199 of the second vehicle 123 receives the read message and transmits a response message to the third vehicle 123 that includes "Data E." The provision system 199 of the third vehicle 123 stores "Data E" on the memory 127 of the third vehicle 123.

Figure 1D:
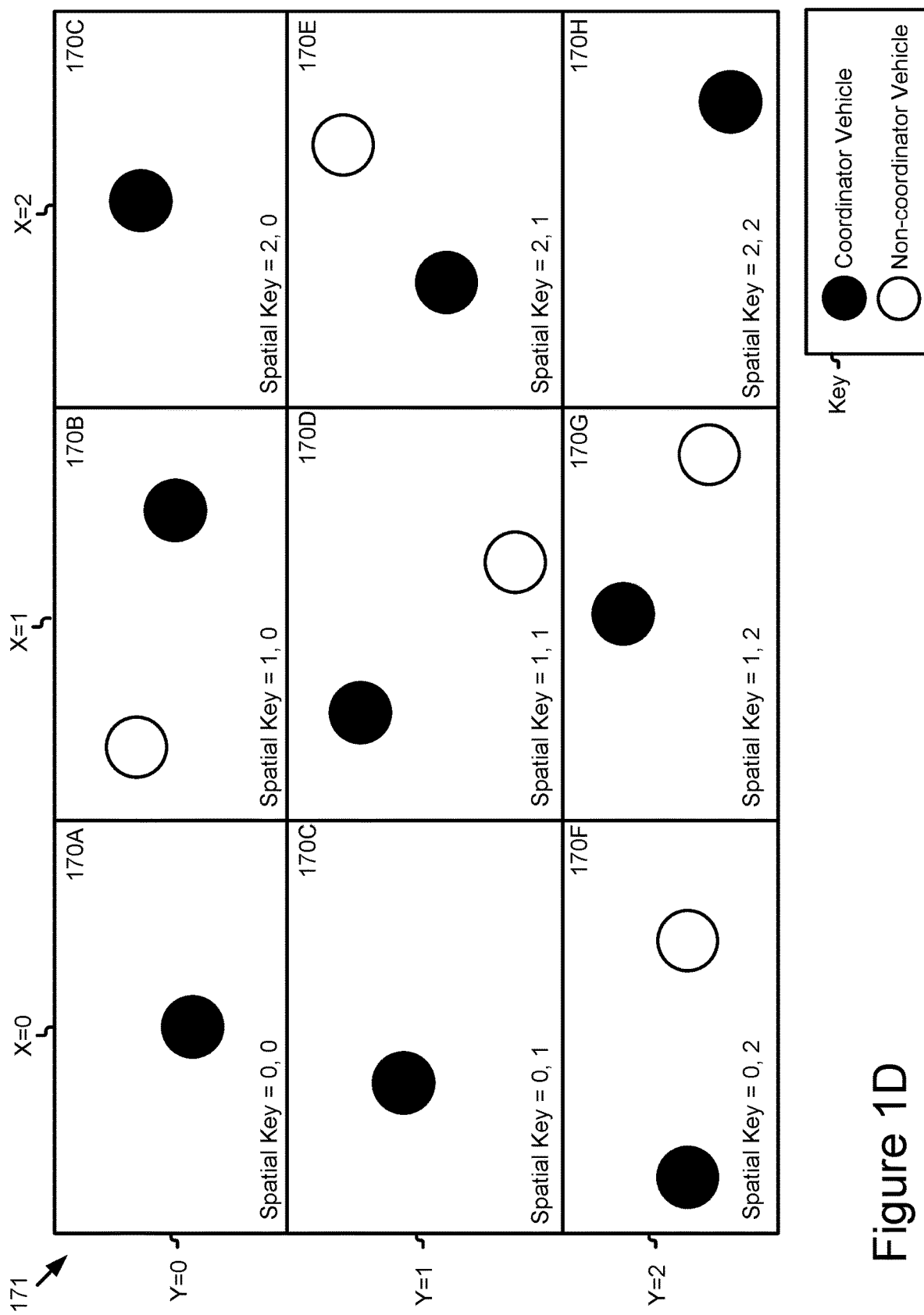
FIG. 1D is a block diagram illustrating an example of a roadway area and spatial keys for a plurality of roadway regions according to some embodiments.

Referring now to FIG. 1D, depicted is a block diagram illustrating an example of a roadway area 171 and spatial keys for a plurality of roadway regions 170A-H included in the roadway area 171 according to some embodiments.

A roadway area 171 includes a roadway and areas proximate to the roadway. For example, a roadway area includes a portion of an interstate highway and area that is proximate to the interstate highway such as on-ramps, exit ramps, breakdown lanes, parking lots, gas stations, fast-food restaurants, hotels, motels, etc. In one embodiment, the roadway area may include a defined region such a 5 mile portion of the roadway (or some other positive range that includes the roadway) and an area that is 100 yards in direction of the defined region (or some other positive range that includes the area that is proximate to the roadway).

A grid is assigned to a roadway area 171. As depicted, the grid is three-by-three, but in practice the grid can be other sizes. As depicted, each block of the grid is a separate roadway region 170A-H. The roadway regions 170A-H can be the same size as one another or different sizes.

In some embodiments, the grid and the roadway regions 170A-H are predetermined at design time. For example, at design time a roadway area 171 is divided into different roadway regions 170 using a grid or some other system or dividing the roadway areas into known roadway regions.

In some embodiments, each roadway region 170A-H is assigned a spatial key. For example, the roadway region 170A is assigned a spatial key equal to [0, 0] and the roadway region 170F is assigned a spatial key [0, 2]. Other spatial keys are depicted in FIG. 1D. Each roadway region includes a coordinator vehicle (or, in some embodiments, a coordinator node since a coordinator for a particular roadway region may include a non-vehicle node 103). The coordinator vehicle for a particular roadway regions manages the data storage for that roadway region. The spatial keys for the different roadway regions are assigned in advance and stored in a lookup table or some other data structure. The lookup table also identifies the coordinator vehicle for each roadway region and data describing how to contact that coordinator vehicle via the network 105. In some embodiments, each coordinator vehicle stores the lookup table in their memory 127 so that each coordinator vehicle knows the spatial keys, the coordinator vehicles for the different roadway regions and how to contact the different coordinators. In some embodiments, each mobile node of the roadway area 171, whether they be a coordinator or not, stores the lookup table in their memory 127. The lookup table is described in more detail below with reference to FIG. 1G.

As described in more detail below with reference to FIGS. 3, 4 and 5, a non-coordinator vehicle (or non-coordinator node) for a roadway region may initiate communication with a mobile node of another roadway region by initiating that communication through the coordinator vehicle (or coordinator node) for their own roadway region. Coordinator vehicles (or coordinator nodes) of different roadway regions directly communication with one another via the network 105. However, a coordinator vehicles (or coordinator nodes) do not directly communicate with non-coordinator vehicles (or non-coordinator nodes) of different roadway regions. For example, if a coordinator vehicle of a first roadway region (e.g., the roadway region 170F assigned spatial key 0, 2) wants to read or write data with a different roadway region (e.g., the roadway region 170C assigned spatial key 2,0), then the coordinator vehicle for first roadway region may communicate with a third roadway region (e.g., the roadway region 170D assigned spatial key 1, 1) who then relays that message to the coordinator vehicle for the second roadway region. The coordinator for the second roadway region then processes the read or write request as described below with reference to one or more of FIGS. 3, 4 and 5.

In some embodiments, the spatial key for a particular embodiment region may include a latitude and a longitude of a center point (or approximate center point) of that roadway region. In other embodiments, the spatial keys may be assigned using unique identifiers or some other construct.

Figure 1E:
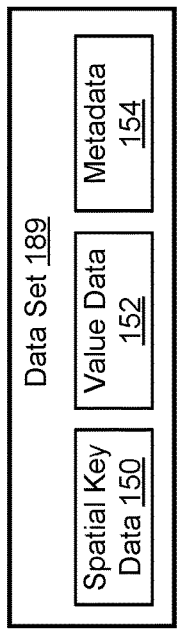
FIG. 1E is a block diagram of a data set configured to be read, written, stored or transmitted by a provision system according to some embodiments.

Referring now to FIG. 1E, depicted is a block diagram of a data set 189 configured to be read, written, stored or transmitted by a provision system 199 according to some embodiments.

The data set 189 may include a spatial key data 150, value data 152 and metadata 154.

In some embodiments, the spatial key data 150 may include data that identifies where a particular value data 152 is stored. The value data 152 describes a value. The metadata 154 includes data that is associated with the value, the owner of the value or the requester of a command in relation to the value. The owner of the value is the mobile node that stores the value or will be storing the value after the conclusion of a present write command (or the processing of a write message). The requester is the mobile node that is transmitting either a write message (wrote command) or a read message (read command) in relation to the value (e.g., write this value to your memory as in FIG. 4, or read this value from your memory and transmit it to me as in FIG. 3).

In some embodiments, each of the data sets (e.g., the first data 180, the second data 182, the third data 184 and "Data A" through "Data H") may include elements that are similar to the data set 189. For example, all data sets 180 that are read, written, stored or transmitted by the provision system 199 may include a spatial key data 150, its own value data 152 and its own metadata 154.

Figure 1F:
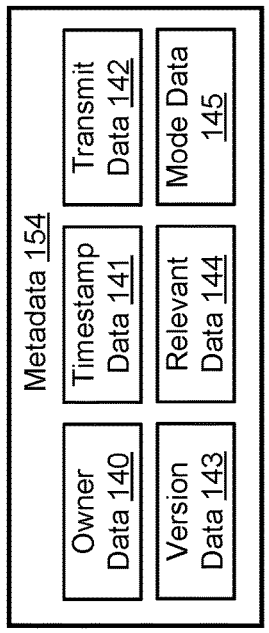
FIG. 1F is a block diagram of metadata configured to be read, written, stored or transmitted by a provision system according to some embodiments.

Referring now to FIG. 1F, depicted is a block diagram of metadata 154 configured to be read, written, stored or transmitted by a provision system 199 according to some embodiments.

The metadata 154 includes one or more of the following elements: owner data 140; timestamp data 141; transmit data 142; version data 143; relevant data 144; and mode data 145.

The owner data 140 describes which mobile node within a particular roadway region 170 owns an instance of value data 152. This is the mobile node whose memory 127 stores a particular instance of value data 152. In some embodiments, the memory 127 of a particular mobile node may store one or more different instances of value data 152.

The timestamp data 141 describes one or more timestamps associated with any of the data included in the data set 189. For example, the timestamp data 141 may describe a time when a mobile node was at a certain geographic location, a time when a particular mobile node was assigned ownership of a particular instance of value data 152, a time when a transmission occurred, a time when a mobile node entered a roadway region or left a roadway region, etc.

The transmit data 142 describes how to communicate with a particular mobile node. For example, the transmit data 142 may specify, for a particular mobile node, what non-infrastructure-based wireless communication capabilities it has and any information needed to successfully communicate with it via different wireless communication types. The transmit data 142 may describe how to communicate with an owner of a particular instance of value data 152.

The version data 143 identifies a version value or number for a particular instance of value data 152.

The relevant data 144 describes any digital data that is relevant to a particular instance of value data 152. For example, the relevant data 144 may include DSRC data that is relevant to a particular data set 189 or instance of value data 152. DSRC data is described in more detail below with reference to FIGS. 1J and 1K.

The mode data 145 describes a propagation mode (or other user-tunable parameters) for propagating data or distributing data within a roadway region or a roadway area. For example, the mode data 145 may describe how value data 152 or data sets 189 are propagated in a particular roadway region (i.e., propagation data) or distributed within a particular roadway region (i.e., distribution data).

Figure 1G:
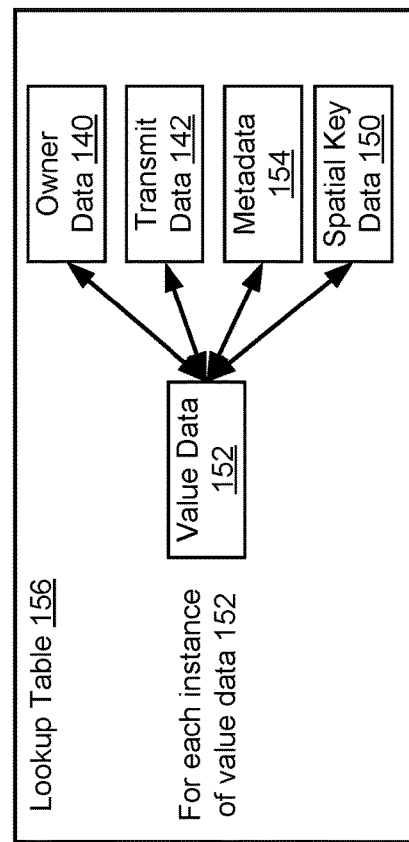
FIG. 1G is a block diagram of a lookup table configured to be read, written, stored, transmitted other otherwise utilized by a provision system according to some embodiments.

Referring now to FIG. 1G, depicted is a block diagram of a lookup table 156 configured to be read, written, stored, transmitted or otherwise utilized by a provision system 199 according to some embodiments.

For each instance of value data 152, the lookup table 156 describes one or more of the following: (1) the owner data 140 for that instance of value data 152; (2) the transmit data 142 for the owner described by the owner data 140; (3) metadata 154 for that instance of value data 152; and (4) the spatial key data 150 for that instance of value data 152.

The lookup table 156 may include a plurality of instances of value data 152. The lookup table 156 may be some other data construct other than a lookup table.

Referring now to FIG. 1H, depicted is a block diagram illustrating a process flow 160 for provision system 199 to identify an instance of spatial key data 150 according to some embodiments.

In some embodiments, the provision system 199 includes a hash function that is encoded so that it is operable to output the correct spatial key data 150 for an instance of a value data 152 if the instance of value data 152 is provided to it as an input. The hash function is also operable to output the metadata 154 for a particular instance of value data 152 if provided that instance of value data 152 as an input. The hash function is also operable to output a data set 189 for the instance of value data 152 that includes the instance of value data 152, the correct spatial key data 150 for that instance of value data 152 and the correct metadata 154 for that instance of value data 152.

In some embodiments, the provision system 199 does not include the hash function and instead uses the lookup table 156 to generate the outputs described above.

Referring now to FIG. 1I, depicted is a block diagram illustrating a process flow 162 for provision system to identify an owner of a value and data for contacting the owner of the value according to some embodiments.

For example, the provision system 199 includes a hash function that is encoded so that it is operable to receive an instance of value data 152 as an input and output owner data 140 and transmit data 142 that accurately describe the owner for that instance of value data 152 and how to communicate with that owner. This data may be stored together as contact data 164 which is outputted by the provision system 199.

In some embodiments, the provision system 199 does not include the hash function and instead uses the lookup table 156 to generate the outputs described above.

Referring now to FIG. 1J, depicted is a block diagram illustrating DSRC data including path history data for a mobile node according to some embodiments.

As described above, a mobile node may transmit a DSRC message. The DSRC message may include one or more of a conventional DSRC message, a DSRC probe, or Basic Safety Message ("BSM" if singular, or "BSMs" if plural).

The regular interval for transmitting BSMs is user configurable. In some implementations, a default setting for this interval is transmitting the BSM every 0.10 seconds or substantially every 0.10 seconds. A BSM is broadcasted over the 5.9 GHz DSRC band.

The range for transmitting DSRC messages is substantially 1,000 meters. In some implementations, DSRC range is a range of substantially 100 meters to substantially 1,000 meters.

Referring now to FIG. 1K, depicted is a block diagram illustrating DSRC data 195 according to some embodiments. Each DSRC message, regardless of type, may include any or all of the DSRC data 195. In some implementations, the DSRC data 195 is an element of the metadata for a particular data set 189.

A DSRC message may include two parts. These two parts may include different DSRC data 195 as shown in FIG. 1K.

Part 1 of the DSRC data 195 may describe one or more of the following: vehicle position; vehicle heading; vehicle speed; vehicle acceleration; vehicle steering wheel angle; and vehicle size.

Part 2 of the DSRC data 195 may include a variable set of data elements drawn from a list of optional elements. Some of the DSRC data 195 included in Part 2 of the DSRC message are selected based on event triggers, e.g., anti-locking brake system ("ABS") being activated may trigger DSRC data 195 relevant to the ABS system of the vehicle.

In some implementations, some of the elements of Part 2 are transmitted less frequently in order to conserve bandwidth.

In some implementations, the DSRC data 195 included in a DSRC message includes current snapshots of a vehicle traveling along a roadway system.

Figure 2:
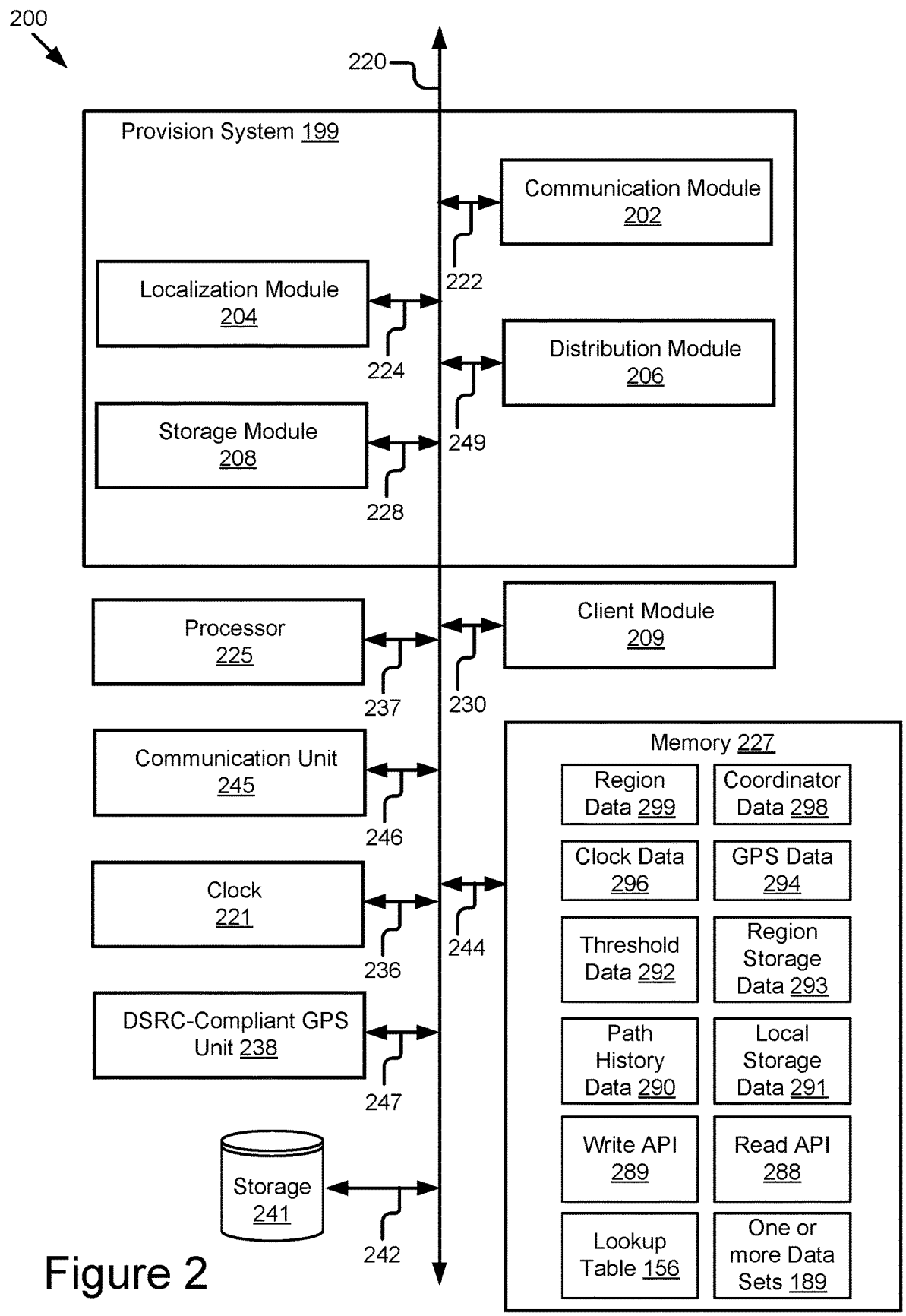
FIG. 2 is a block diagram illustrating an example computer system including a provision system according to some embodiments.

Referring now to FIG. 2, depicted is a block diagram illustrating an example computer system 200 including a provision system 199 according to some embodiments.

In some embodiments, the computer system 200 may include a special-purpose computer system that is programmed to perform one or more steps of the methods 300, 400 described below with reference to FIGS. 3 and 4.

In some embodiments, the computer system 200 may include a processor-based computing device. For example, the computer system 200 may include an onboard vehicle computer system of the first vehicle 123 or the second vehicle 124; the computer system 200 may also include the non-vehicle node 103.

The computer system 200 may include one or more of the following elements according to some examples: the provision system 199; a processor 225; a communication unit 245; a clock 221; a DSRC-compliant GPS unit 238; a storage 241; a memory 227; and a client module 209. The components of the computer system 200 are communicatively coupled by a bus 220.

In the illustrated embodiment, the processor 225 is communicatively coupled to the bus 220 via a signal line 237. The communication unit 245 is communicatively coupled to the bus 220 via a signal line 246. The clock 221 is communicatively coupled to the bus 220 via a signal line 236. The DSRC-compliant GPS unit 238 is communicatively coupled to the bus 220 via a signal line 247. The storage 241 is communicatively coupled to the bus 220 via a signal line 242. The memory 227 is communicatively coupled to the bus 220 via a signal line 244. The client module 209 is communicatively coupled to the bus 220 via a signal line 230.

The processor 225 includes an arithmetic logic unit, a microprocessor, a general-purpose controller, or some other processor array to perform computations and provide electronic display signals to a display device. The processor 225 processes data signals and may include various computing architectures including a CISC architecture, a RISC architecture, or an architecture implementing a combination of instruction sets. Although FIG. 2 includes a single processor 225, multiple processors may be included. The processor 225 may include a graphical processing unit. Other processors, operating systems, sensors, displays, and physical configurations may be possible.

The communication unit 245 may include hardware that transmits and receives data to and from the network 105. In some embodiments, the communication unit 245 includes a port for direct physical connection to the network 105 or to another communication channel. For example, the communication unit 245 includes a USB, SD, CAT-5, or similar port for wired communication with the network 105. In some embodiments, the communication unit 245 includes a wireless transceiver for exchanging data with the network 105 or other communication channels using one or more wireless communication methods, including Bluetooth, DSRC, mmWave, full-duplex wireless communication or another suitable wireless communication method which does not include or rely on infrastructure elements such as cellular towers, hardware servers or server farms.

In some embodiments, the communication unit 245 includes a wireless transceiver for exchanging data with the network 105 or other communication channels using one or more wireless communication methods, including: Bluetooth, EN ISO 14906:2004 Electronic Fee Collection—Application interface EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); mmWave communication; the communication method described in U.S. patent application Ser. No. 14/471,387 filed on Aug. 28, 2014 and entitled "Full-Duplex Coordination System"; or another suitable wireless communication method.

In some embodiments, the communication unit 245 does not include a cellular communications transceiver for sending and receiving data over a cellular communications network including via WAP, e-mail, or another type of electronic communication that rely on cellular infrastructure, hardware servers or server farms.

In some embodiments, the communication unit 245 includes a DSRC transceiver and a DSRC receiver.

In some embodiments, the communication unit 245 includes a mmWave transceiver and a mmWave receiver.

In some embodiments, the communication unit 245 includes full-duplex coordination system as described in U.S. patent application Ser. No. 14/471,387 filed on Aug. 28, 2014 and entitled "Full-Duplex Coordination System."

The clock 221 includes a software, hardware or a combination of hardware and software that is configured to monitor the passage of time.

In some embodiments, the clocks 221 of a plurality of computer systems 200 are synchronized so that they each monitor the passage of time in synchronization with one another. In this way, for any point in time, the clock 221 of a first vehicle 123 and the clock 221 of a second vehicle 124 may each indicate the same time or substantially the same time.

The clock 221 generates clock data 296 that describes the time measured by the clock 221. The clock data 296 is stored on the memory 227.

In some embodiments, the clock 221 also generates timestamps and other data related to time that is stored in the memory 227. For example, some of the DSRC data 195 (which is stored in the memory 227, although not depicted as such in FIG. 2) may be generated by the clock 221 and stored in the memory 227 as elements of the DSRC data 195.

A DSRC-compliant GPS unit 238 is operable to provide GPS data 294 describing the location of computer system 200 with lane-level accuracy. For example, the computer system 200 is an element of a vehicle such as the first vehicle 123 or the second vehicle 123, or a non-vehicle node 103 traveling in a vehicle on a roadway. Lane level accuracy means that the location of the vehicle is described so accurately that the vehicle's lane of travel may be accurately determined. In the context of the provision system 199, lane level accuracy enables the provision system 199 to more accurately determine which roadway region the vehicle is located in and when the vehicle is leaving the roadway region to enter a different roadway region as depicted in FIG. 1B.

In some embodiments, the DSRC-compliant GPS unit 238 includes hardware that wirelessly communicates with a GPS satellite to retrieve GPS data 294 that describes a location of the computer system 200 with a precision that is compliant with the DSRC standard. The DSRC standard requires that GPS data 294 be precise enough to infer if two computer systems 200 (which are elements of different vehicles) are in the same lane at the same time. The lane may be a lane of a roadway. In some embodiments, the DSRC-compliant GPS unit 238 is operable to identify, monitor and track its two-dimensional position within 1.5 meters of its actual position 68% of the time under an open sky. Since lanes of a roadway are typically no less than 3 meters wide, whenever the two-dimensional error of the GPS data 294 is less than 1.5 meters the provision system 199 described herein may analyze the GPS data 294 provided by the DSRC-compliant GPS unit 238 and determine what lane of the roadway the computer system 200 is traveling in based on the relative positions of two or more different computer systems 200 on the roadway at the same time.

By comparison to the DSRC-compliant GPS unit 238, a conventional GPS unit which is not compliant with the DSRC standard is unable to determine the location of a computer system 200 with lane-level accuracy. For example, a typical lane of a roadway is approximately 3 meters wide. However, a conventional GPS unit only has an accuracy of plus or minus 10 meters relative to the actual location of the computer system 200. As a result, such conventional GPS units are not sufficiently accurate for use by the provision system 199 since they would not accurately reflect the roadway region where the computer system 200 is located, and eventually result in a computer system 200 leaving a roadway region without distributing the one or more data sets 189 stored on its memory 127 to the other computer systems 200 of the roadway region as depicted in FIG. 1B. This would break the regional storage system described herein so that is not sufficiently reliable for acceptance by human users of the regional storage system.

The client module 209 includes an application or system of the computer system 200 that may make requests for one or more data sets 189 to be read or written. For example, the client module 209 may include one or more of the following: an electronic control unit; a navigation system; an ADAS system; an infotainment system; and a head unit. The client module 209 may include any system, subsystem or software application of a first vehicle 123, a second vehicle 124 or a non-vehicle node 103, depending on whether the computer system 200 is an element of the first vehicle 123, the second vehicle 124 or the non-vehicle node 103, respectively.

The memory 227 stores instructions or data that may be executed by the processor 225. The instructions or data may include code for performing the techniques described herein. The memory 227 may be a DRAM device, a SRAM device, flash memory, or some other memory device. In some embodiments, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Although not depicted in FIG. 2, the memory 227 may store any or all of the data described below with reference to FIGS. 1D-1K, 3 and 4.

As illustrated in FIG. 2, the memory 227 stores one or more of the following elements: region data 299; coordinator data 298; clock data 296; GPS data 294; threshold data 292; region storage data 293; path history data 290; local storage data 291; write application programming interface ("API") 289; read API 288; one or more data sets 189; and the lookup table 156. The data set 189 and the lookup table 156 is described above with reference to FIGS. 1E, 1F, 1G, 1H, 1J and 1K, and so, those descriptions will not be repeated here.

The region data 299 may include digital data that describes the one or more roadway regions 170 for a roadway area (or a plurality of roadway areas). The region data 299 may also describe the spatial keys for the different roadway regions. The region data 299 may describe which mobile nodes are present in each different roadway region.

The coordinator data 298 describes who the coordinator vehicle or coordinator node is for each of the different roadway regions described by the region data 299. The coordinator data 298 may also describe how data is distributed in each of these roadway regions and/or how data is propagated within these different roadway regions. The coordinator data 298 may describe how to contact each of the different coordinators (e.g., coordinator vehicles or coordinator nodes) for the different roadway regions (e.g., the mode of communication and any data necessary to successfully communicate with the coordinator).

In some embodiments, the coordinator data 298 may identify a particular computer system 200 as the coordinator vehicle or coordinator node for that particular roadway region. The other mobile nodes of this particular roadway region may know the identity of the coordinator vehicle or coordinator node for that particular roadway region so that they follow any read or write commands provided to them by their assigned coordinator.

In some embodiments, a particular computer system 200 is assigned the role of coordinator for a roadway region at random by the computer system 200 itself or coordinator with the other computer systems 200 located within that roadway region. In some embodiments, a particular computer system 200 is assigned the role of coordinator based on one or more rational factors such as: relative computing power of the different computer systems 200 in the roadway region with the most computing power being favored; available memory space of the different computer systems 200 in the roadway region with the most available memory space being favored; and likelihood that a particular computer system 200 will be present in the roadway region the longest amount of time relative to the other computer systems 200 of that roadway region, with the longest amount of time being favored.

The clock data 296 includes digital data describing the current time or the passage of time.

The GPS data 294 includes digital data describing the DSRC-compliant GPS coordinate for the computer system 200.

The threshold data 292 describes a threshold which indicates when a data synchronization event occurs or when a computer system 200 is determined to be leaving a roadway region.

For example, the threshold data 292 for a data synchronization event may be determined by the distribution module 206 at time intervals described by the threshold data 292 and measured against the clock data 296. In this way, a data synchronization event occurs at regular time intervals. The data synchronization event is described in more detail below with reference to the methods 300, 400 of FIGS. 3 and 4.

In another example, the threshold data 292 for a data synchronization event may be determined by the distribution module 206 whenever the GPS data 294 for the computer system 200 indicates that a geographical threshold described by the threshold data 292 is met In another example, the threshold data 292 for a computer system 200 to distribute their data sets 189 belonging to the roadway region are distributed to the other mobile nodes of the roadway region based on the distribution module 206 determining that the GPS data 294 for the computer system 200 indicates that a geographical threshold described by the threshold data 292 is met. See, for example, FIG. 1B.

The region storage data 293 identifies which mobile nodes are present in a particular roadway region in which the computer system 200 is present and which data sets 189 are stored on these mobile nodes. For example, the region storage data 293 may describe which values are stored at which mobile nodes of a particular roadway region. In some embodiments, only the coordinator for a particular roadway region has the region storage data 293 for that particular roadway region.

The path history data 290 describes a series of DSRC-compliant GPS coordinates for the computer system 200 and times when the computer system 200 was present at each of these DSRC-compliant GPS coordinates.

The local storage data 291 describes, for a particular computer system 200, which data sets 189 are stored on its local memory 227. The local storage data 291 may describe, for example, identifiers of the values stored by the memory 227 in the one or more data sets 189 of the memory 227.

The write API 289 includes any data necessary to transmit a successful write message or write command to another provision system 199 of another computer system 200.

The read API 288 includes any data necessary to transmit a successful read message or read command to another provision system 199 of another computer system 200.

The memory 227 may store one or more data sets 189 such as was described above with reference to FIGS. 1E, 1F, 1G, 1J and 1K.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the provision system 199 includes a communication module 202, a localization module 204, a distribution module 206 and a storage module 208. These components of the provision system 199 are communicatively coupled to each other via the bus 220.

The communication module 202 can be software including routines for handling communications between the provision system 199 and other components of the computer system 200. In some embodiments, the communication module 202 can be a set of instructions executable by the processor 225 to provide the functionality described below for handling communications between the provision system 199 and other components of the computer system 200. In some embodiments, the communication module 202 can be stored in the memory 227 of the computer system 200 and can be accessible and executable by the processor 225. The communication module 202 may be adapted for cooperation and communication with the processor 225 and other components of the computer system 200 via signal line 222.

The communication module 202 sends and receives data, via the communication unit 245, to and from one or more elements of the operating environment 100 or a roadway area 171. For example, the communication module 202 sends and receives write messages, read messages or acknowledgement messages.

In some embodiments, the communication module 202 receives data from components of the provision system 199 and stores the data in one or more of the storage 241 and the memory 227.

In some embodiments, the communication module 202 may handle communications between components of the provision system 199 or the computer system 200.

The localization module 204 can be software including routines for tracking the GPS data 294 over time (as described by the clock data 296) and generating the path history data 290.

In some embodiments, the localization module 204 can be stored in the memory 227 of the computer system 200 and can be accessible and executable by the processor 225. The localization module 204 may be adapted for cooperation and communication with the processor 225 and other components of the computer system 200 via signal line 224.

The distribution module 206 can be software including routines for (1) generating and maintaining the lookup table 156 and (2) generating and maintaining the region storage data 293 and the local storage data 291 which collectively describe where different sets of data 189 are stored within the roadway region to which the computer system 200 belongs. In some embodiments, the region storage data 293 and the local storage data 291 are elements of the lookup table 156. In some embodiments, the distribution module 206 may be operable to receive inputs (e.g., a particular instance of value data 152) and then output data for that input as described above with reference to FIGS. 1H and 1L.

The distribution module 206 may also include the hash function described above with reference to FIGS. 1H and 1L. In some embodiments, the distribution module 206 may maintain the hash function so that it operates correctly.

In some embodiments, the hash function included in the distribution module 206 is operable to output the spatial key data 150 that corresponds to a particular instance of value data 152 that is provided to the distribution module 206 as an input. These instances of value data 152 may be received as read messages or write messages via one or more of the communication module 202 and the communication unit 245.

In some embodiments, the distribution module 206 may generate messages in response to one or more read messages or write messages. For example, the distribution module 206 may generate one or more of the responses described below with reference to FIGS. 3, 4 and 5. These read or write messages may be transmitted by the client module 209 or another mobile node.

In some embodiments, the distribution module 206 may instruct the storage module 208 to read data from the memory 227 or write data to the memory 227. For example, the distribution module 206 may instruct the storage module 208 to read from the memory 227 responsive to a read message or write data to the memory 227 responsive to a write message.

In some embodiments, the distribution module 206 may be operable, when executed by the processor 225, to cause the processor 225 to execute one or more of the steps described below with reference to methods 300, 400 of FIGS. 3 and 4.

In some embodiments, the distribution module 206 can be stored in the memory 227 of the computer system 200 and can be accessible and executable by the processor 225. The distribution module 206 may be adapted for cooperation and communication with the processor 225 and other components of the computer system 200 via signal line 249.

The storage module 208 can be software including routines for reading data from the memory 227 or writing data to the memory 227 as instructed by the distribution module 206. The storage module 208 may manage the operation of the memory 227 and the storage 241. The storage module 208 may also manage the operation of a distributed storage system (not pictured) via one or more of the communication module 202 and the communication unit 245.

In some embodiments, the storage module 208 can be stored in the memory 227 of the computer system 200 and can be accessible and executable by the processor 225. The storage module 208 may be adapted for cooperation and communication with the processor 225 and other components of the computer system 200 via signal line 228.

Figure 3:
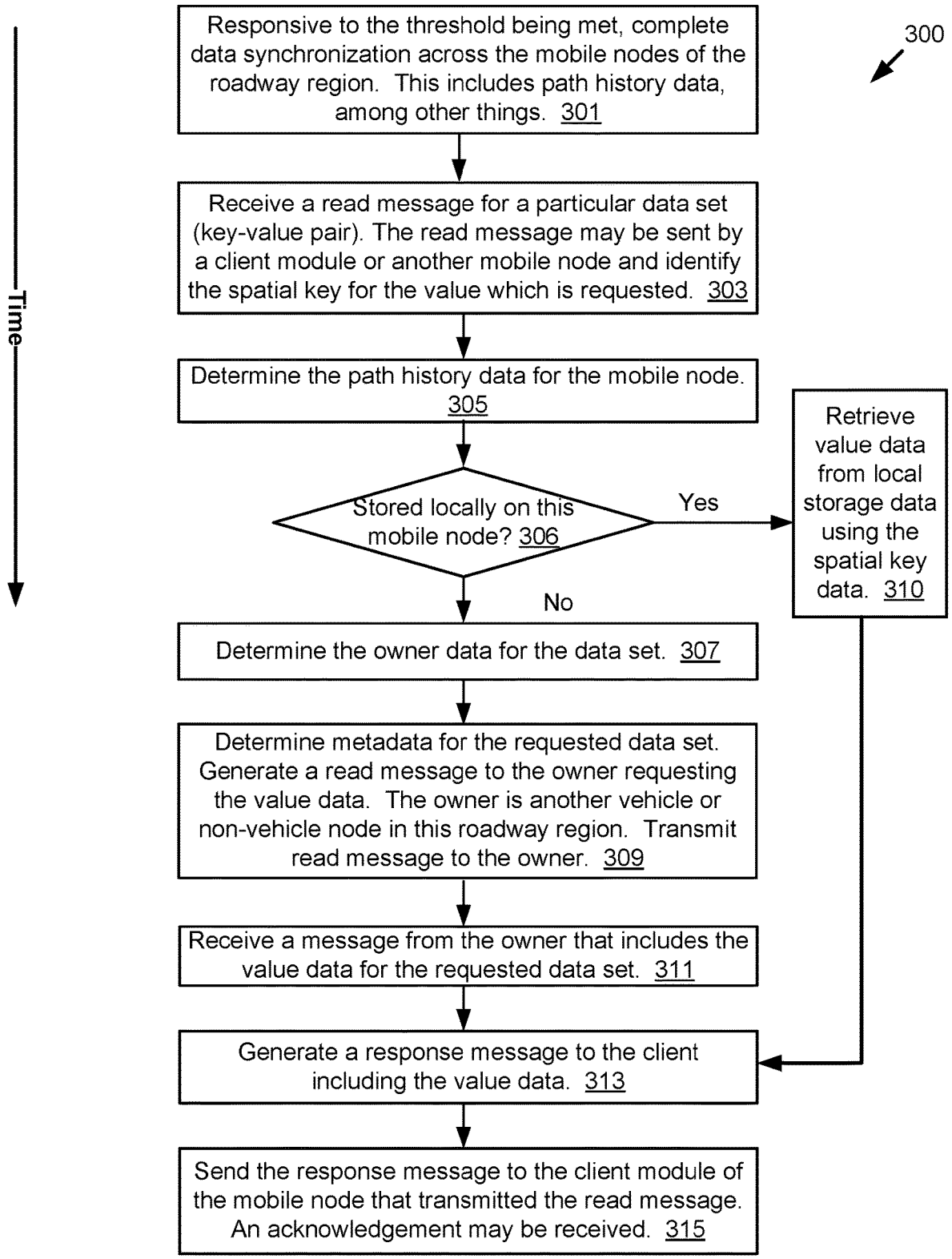
FIG. 3 is a flowchart of an example method for processing a read message according to some embodiments.

Referring now to FIG. 3, depicted is a flowchart of an example method 300 for processing a read message according to some embodiments. One or more steps of the method 300 may be executed by the computer system 200 described above with reference to FIG. 2.

At step 301, responsive to the threshold being met, a data synchronization event is completed across the mobile nodes of the roadway region. This data synchronization event may synchronize one or more of the following types of data across the memories of the mobile nodes for a given roadway region: the region data 299; the coordinator data 298; the region storage data 293; the local storage data 291; the threshold data 292; the path history data 290; and the lookup table 156. In this way, some amount of data may be commonly known to each of the mobile nodes within a roadway region.

At step 303, a read message is received. The read message may request to read (or have access to) a particular data set 189. The read message may be sent by a client module or another mobile node and identify the spatial key for the value which is requested. For example, the read message may include an instance of spatial key data. The read message may also include an identifier of the value which is paired with the spatial key data, but not the actual content of the value data that is paired with the spatial key data. For example, the identifier of the value may include a file name or some other data that identifies the requested value data that is paired with the spatial key data. Such identifiers of the value data may be included in the data which was synchronized across each of the mobile nodes of the roadway region in step 301.

The client module of the mobile node which transmits the read message in step 303 may know the spatial key data and the identifier of the value data based on the data which is synchronized at step 301.

At step 305, the path history data for the mobile node which received the read message at step 303 is determined. This path history data may be analyzed against the spatial key data to determine whether the value data which is being requested is stored locally by this mobile node or on a different mobile node. For example, the path history data may indicate the geographic location of the mobile node and this geographic location may correspond to the spatial key included in the read message or not. Step 305 is an optional step of the method 300 according to some embodiments.

In some embodiments, the owner data for the spatial key data and the identified value data may be determined based on providing one or more of the spatial key data and the identifier of the value data to the distribution module, which then outputs the owner data using its hash function or the lookup table. The owner data which is outputted by the distribution module indicates whether the value data is stored locally by the memory of this mobile node or remotely by a memory of a different mobile node.

At step 306, a determination is made regarding whether the requested value data is stored locally or remotely. If the value data is determined to be stored locally at step 306, then the method 300 proceeds to step 310. If the value data is determined to be stored remotely at step 306, then the method 300 proceeds to step 307.

At step 310, the value data is retrieved from the local memory using the spatial key data. For example, since the data sets 189 have a paired spatial key and value data associated with that spatial key, the value data may be retrieved from the memory using the spatial key data as a query.

At step 307, the owner data for the requested data set is determined. For example, the owner data may be determined by providing one or more of the spatial key data or the indicator of the value data to the distribution module as an input, which then outputs the owner data for the data set requested by the read message. The distribution module (e.g., the hash function or the lookup table) may be operable to provide this output responsive to this input.

At step 309, the metadata for the data set is determined. For example, the metadata may be determined by providing one or more of the spatial key data or the indicator of the value data to the distribution module as an input, which then outputs the metadata for the data set requested by the read message. The distribution module (e.g., the hash function or the lookup table) may be operable to provide this output responsive to this input. A read message may be transmitted to the owner of the requested data set. The read message may include one or more of the metadata, the spatial key data for the requested data set and the identifier of the value data included in the requested data set.

At step 311, a response message is received from the owner. This response message includes the value data that is included in the requested data set. The mobile node that received the read message at step 303 now includes the spatial key data, the value data, the owner data and the metadata for the requested data set.

At step 313, a response message for the read message received at step 303 is generated. This response message includes the value data for the requested data set which was the subject of the read message received at step 303.

At step 315, the response message generated at step 313 is transmitted to the client module or the mobile node that transmitted the read message which was received at step 303. An acknowledgement message from the client module or the mobile node is subsequently received.

Figure 4:
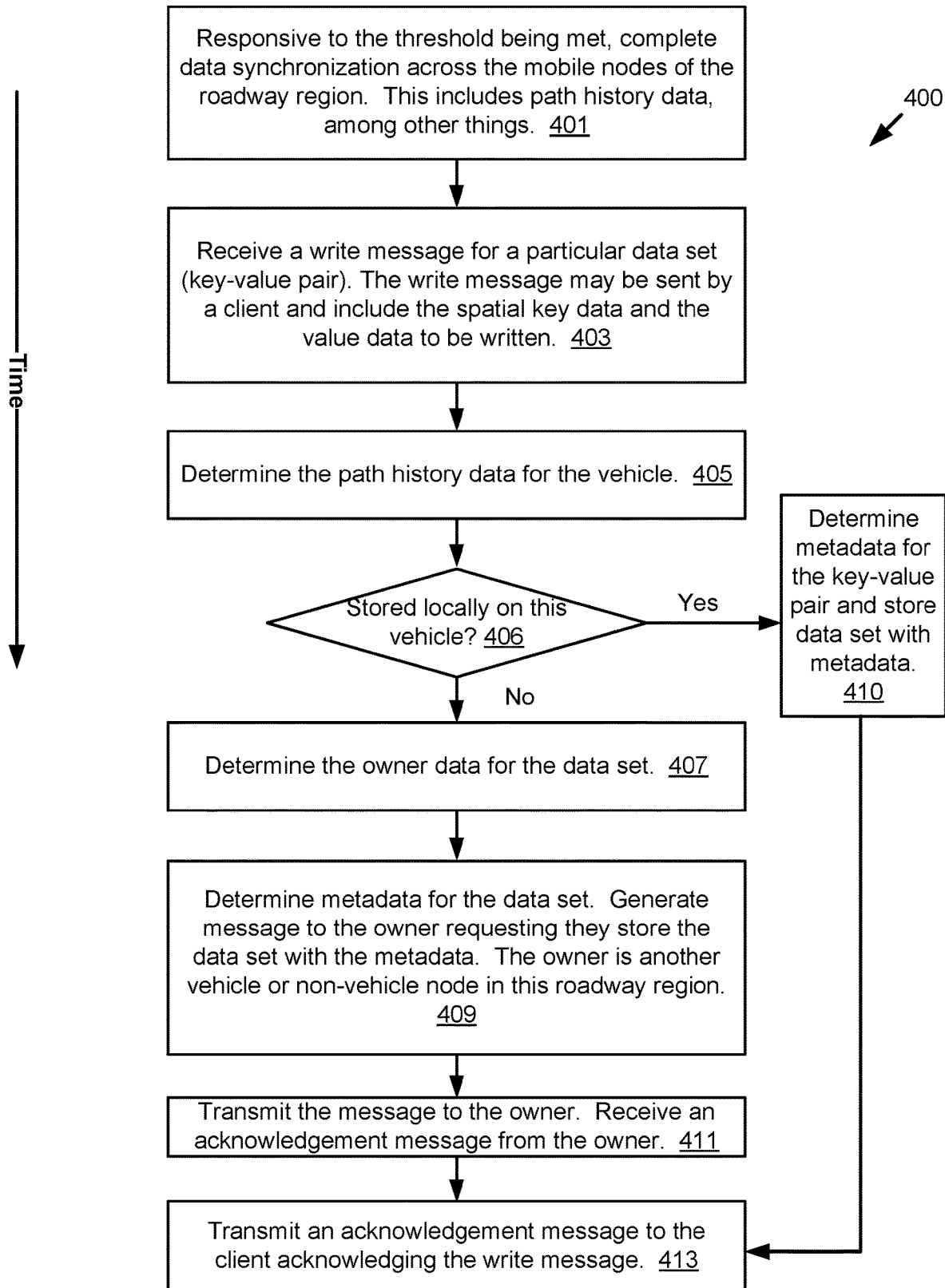
FIG. 4 is a flowchart of an example method for processing a write message according to some embodiments.

Referring now to FIG. 4, depicted is a flowchart of an example method 400 for processing a write message according to some embodiments.

At step 401, responsive to the threshold being met, a data synchronization event is completed across the mobile nodes of the roadway region. This data synchronization event may synchronize one or more of the following types of data across the memories of the mobile nodes for a given roadway region: the region data 299; the coordinator data 298; the region storage data 293; the local storage data 291; the threshold data 292; the path history data 290; and the lookup table 156. In this way, some amount of data may be commonly known to each of the mobile nodes within a roadway region.

At step 403, a write message is received. The write message may request to write a particular data set 189 to a memory of one or the mobile nodes of this roadway region.

The write message may be sent by a client module or another mobile node and identify the spatial key for the value which is requested. For example, the write message may include an instance of spatial key data and the value data to be written.

At step 405, the path history data for the mobile node which received the write message at step 403 is determined. This path history data may be analyzed against the spatial key data to determine whether the value data which is being requested is stored locally by this mobile node or on a different mobile node. For example, the path history data may indicate the geographic location of the mobile node and this geographic location may correspond to the spatial key included in the read message or not. Step 405 is an optional step of the method 400 according to some embodiments.

In some embodiments, the owner data for the spatial key data and the value data included in the write message may be determined based on providing one or more of the spatial key data and the value data to the distribution module, which then outputs the owner data using its hash function or the lookup table. The owner data which is outputted by the distribution module indicates whether the data set included in the write message is stored locally by the memory of this mobile node or remotely by a memory of a different mobile node.

At step 406, a determination is made regarding whether the data set is stored locally or remotely. If the data set is determined to be stored locally at step 406, then the method 400 proceeds to step 410. If the data set is determined to be stored remotely at step 406, then the method 400 proceeds to step 407.

At step 410, the metadata for the data set is generated and the stored, along with the data set, in the local memory At step 407, the owner data for the data set is determined.

At step 409, the metadata for the data set is determined. A write message may be transmitted to the owner of the data set. The write message may include one or more of the metadata, the spatial key data for the value data.

At step 411, the write message is transmitted to the owner and the owner transmits an acknowledgement.

At step 413, an acknowledgement message for the write message received at step 403 is generated and transmitted to the transmitter of the write message received at step 403.

Figure 5:
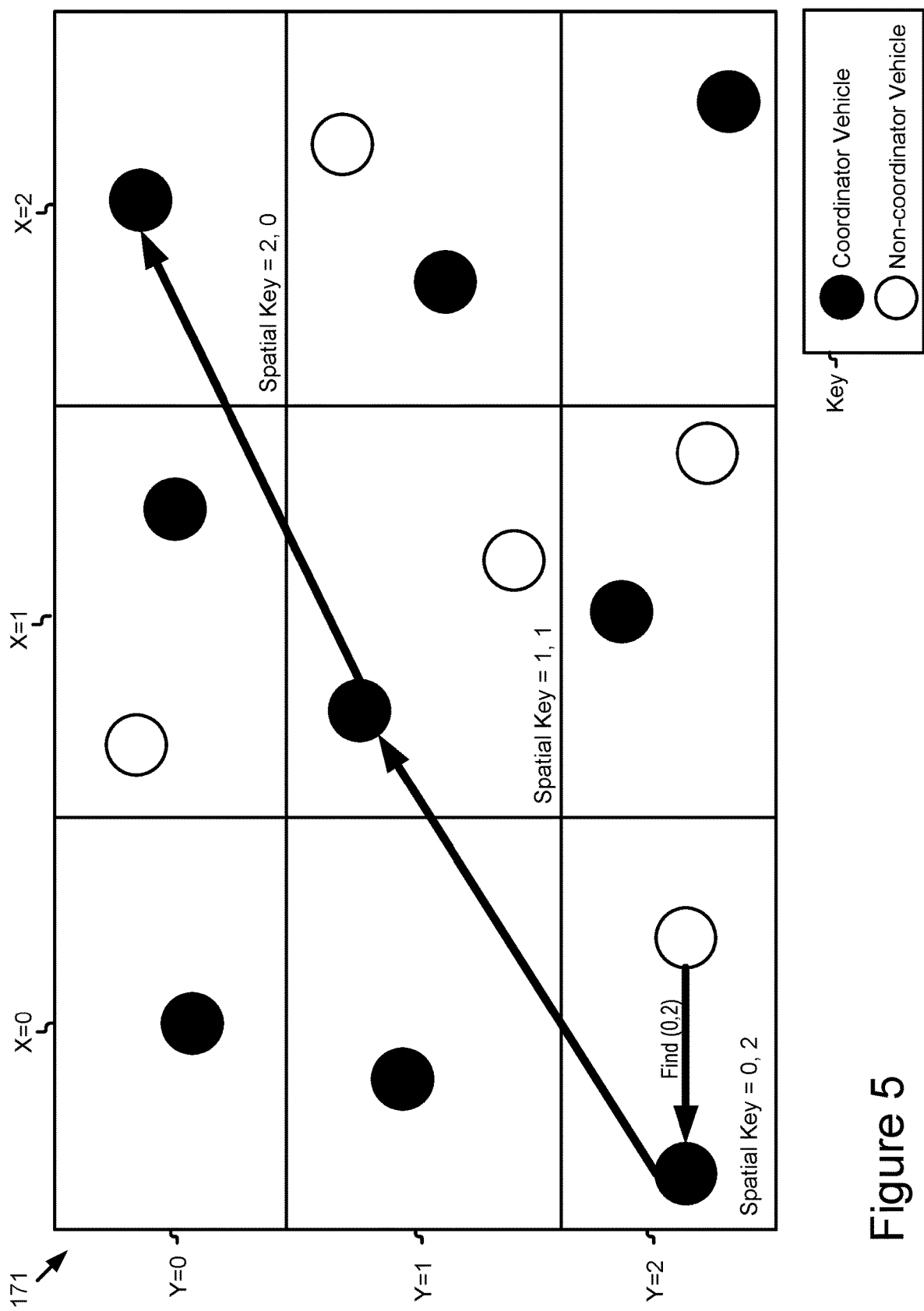
FIG. 5 is a block diagram illustrating an example use case of a regional storage system according to some embodiments.

Referring now to FIG. 5, depicted is a block diagram illustrating an example use case of a regional storage system according to some embodiments.

In FIG. 5, the roadway area 171 is partitioned into a three-by-three grid. A non-coordinator vehicle in a roadway region assigned spatial key 0,2 requests to read data which is stored in a roadway region assigned spatial key 2,0. FIG. 5 depicts a read message being transmitted, and relayed by the coordinator of the roadway region assigned spatial key 1, 1, to the coordinator for the roadway region assigned spatial key 2,0.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A system comprising:
   an onboard vehicle computer system of a vehicle communicatively coupled to a mobile node via a non-infrastructure network having a communication chain that excludes any infrastructure device;
   wherein the vehicle and the mobile node are present in a roadway area which is partitioned into a plurality of roadway regions which are predetermined;
   wherein the vehicle stores a lookup table that identifies a set of coordinator vehicles that correspond to different roadway regions and how to contact each entity in the set of coordinator vehicle;
   wherein the onboard vehicle computer system determines, based on a heading and path history, that the vehicle is leaving a particular roadway region of the roadway area and, responsive to determining that the vehicle is leaving the particular roadway region, triggers a data storage event and transmits, via the non-infrastructure network, a wireless write message to the mobile node; and
   wherein the wireless write message includes an instance of spatial key data describing the particular roadway region of the roadway area and value data.

2. The system of claim 1, wherein the instance of spatial key data further describes an identifier of a value stored in a memory present in the particular roadway region described by the spatial key data and the wireless write message further includes a request for the value data to be stored in a non-transitory memory.

3. The system of claim 1, wherein any infrastructure device excluded from the non-infrastructure network includes one or more of the following: a cellular tower; a server; or a server farm.

4. The system of claim 1, wherein the non-infrastructure network includes a full-duplex wireless communication network formed between the onboard vehicle computer system and the mobile node and the wireless write message includes a full-duplex wireless communication message.

5. The system of claim 1, wherein the mobile node is a second vehicle.

6. The system of claim 1, wherein the data storage event is triggered by the vehicle meeting a geographical threshold as indicated by the heading and path history.

7. The system of claim 1, wherein:
   the mobile node identifies which of a plurality of mobile nodes of the particular roadway region identified by the spatial key data is an owner of content of the wireless write message and the mobile node takes steps to store the value data in a non-transitory memory.

8. The system of claim 1, wherein the wireless write message is received by the mobile node in substantially real time relative to a time when the wireless write message was transmitted.

9. A method implemented by an onboard vehicle computer system of a vehicle communicatively coupled to a mobile node via a non-infrastructure network having a communication chain that excludes any infrastructure device, wherein the vehicle and the mobile node are present in a roadway area which is partitioned into a plurality of roadway regions which are predetermined, the method comprising:
   storing a lookup table that identifies a set of coordinator vehicles that correspond to different roadway regions and how to contact each entity in the set of coordinator vehicles;

determining, by the onboard vehicle computer system, based on a heading and path history, that the vehicle is leaving a particular roadway region of the roadway area;

responsive to determining that the vehicle is leaving the particular roadway region, triggering a data storage event and transmitting, by the onboard vehicle computer system via the non-infrastructure network, a wireless write message to the mobile node, wherein the wireless write message includes an instance of spatial key data describing the particular roadway region of the roadway area and value data; and receiving, by the vehicle via the non-infrastructure network, a response message to the wireless write message.

10. The method of claim 9, wherein the wireless write message includes a basic safety message.

11. The method of claim 9, wherein the non-infrastructure network includes a millimeter wave communication network formed between the onboard vehicle computer system and the mobile node and the wireless write message includes a millimeter wave communication message.

12. The method of claim 9, wherein the non-infrastructure network includes a full-duplex wireless communication network formed between the onboard vehicle computer system and the mobile node and the wireless write message includes a full-duplex wireless communication message.

13. The method of claim 9, wherein the mobile node is a second vehicle.

14. The method of claim 9, wherein the instance of spatial key data further describes an identifier of a value stored in a memory present in the particular roadway region described by the spatial key data and the wireless write message further includes a request for the value data to be stored in a non-transitory memory.

15. The method of claim 14, wherein the mobile node identifies which of a plurality of mobile nodes of the particular roadway region identified by the spatial key data is an owner of content of the wireless write message and the mobile node takes steps to store the value data in the non-transitory memory.

16. The method of claim 14, wherein the vehicle is a first vehicle, the onboard vehicle computer system transmits a wireless read message to a second vehicle, and the second vehicle identifies which of a plurality of mobile nodes of the particular roadway region identified by the spatial key data is an owner of content of the wireless read message and the mobile node takes steps to identify value data corresponding to the spatial key data included in the content and provide a reply message to the first vehicle, via the non-infrastructure network, that includes the value data corresponding to the spatial key data.

17. A computer program product comprising a non-transitory memory of an onboard vehicle computer system of a vehicle communicatively coupled to a mobile node via a non-infrastructure network having a communication chain that excludes any infrastructure device, wherein the vehicle and the mobile node are present in a roadway area which is partitioned into a plurality of roadway regions which are predetermined wherein the onboard vehicle computer system stores computer code executable by the onboard vehicle computer system, causes the onboard vehicle computer system to:

store a lookup table that identifies a set of coordinator vehicles that correspond to different roadway regions and how to contact each entity in the set of coordinator vehicles;

determine, based on a heading and path history, that the vehicle is leaving a particular roadway region of the roadway area;

responsive to a determination that the vehicle is leaving the particular roadway region, trigger a data storage event and transmit, via the non-infrastructure network using the communication chain that excludes any infrastructure device, a wireless write message to the mobile node, wherein the wireless write message includes an instance of spatial key data describing the particular roadway region of the roadway area and value data; and receive, by the mobile node via the non-infrastructure network via the non-infrastructure network, a response message to the wireless write message.

18. The computer program product of claim 17, wherein the wireless write message includes a basic safety message.

19. The computer program product of claim 17, wherein the non-infrastructure network includes a millimeter wave communication network formed between the onboard vehicle computer system and the mobile node and the wireless write message includes a millimeter wave communication message.

20. The computer program product of claim 17, wherein the non-infrastructure network includes a full-duplex wireless communication network formed between the onboard vehicle computer system and the mobile node and the wireless write message includes a full-duplex wireless communication message.

* * * * *